United States Patent
Axén et al.

(10) Patent No.: US 11,012,897 B2
(45) Date of Patent: May 18, 2021

(54) NODES FOR USE IN A COMMUNICATION NETWORK AND METHODS OF OPERATING THE SAME

(71) Applicant: TELEFONAKTIEBOLAGET LM ERICSSON (PUBL), Stockholm (SE)

(72) Inventors: Rasmus Axén, Linköping (SE); Karl Norrman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 551 days.

(21) Appl. No.: 15/306,806

(22) PCT Filed: Sep. 20, 2016

(86) PCT No.: PCT/SE2016/050879
§ 371 (c)(1),
(2) Date: Oct. 26, 2016

(87) PCT Pub. No.: WO2017/061924
PCT Pub. Date: Apr. 13, 2017

(65) Prior Publication Data
US 2017/0272985 A1    Sep. 21, 2017

Related U.S. Application Data

(60) Provisional application No. 62/238,966, filed on Oct. 8, 2015.

(51) Int. Cl.
*H04W 36/00*    (2009.01)
*H04W 36/08*    (2009.01)
(Continued)

(52) U.S. Cl.
CPC ....... *H04W 36/0038* (2013.01); *H01P 1/2005* (2013.01); *H01P 3/12* (2013.01);
(Continued)

(58) Field of Classification Search
CPC . H04W 36/0038; H04W 36/08; H04W 12/04; H04W 88/02; H04W 88/08; H04W 92/20
See application file for complete search history.

(56) References Cited

U.S. PATENT DOCUMENTS 6,418,130 B1 *  7/2002  Cheng ............... H04L 63/06
                                                 370/328
8,879,505 B2 * 11/2014  Zhou ................ H04W 12/06
                                                 370/331
(Continued)

FOREIGN PATENT DOCUMENTS

| JP | 2006319971 A | 11/2006 |
|---|---|---|
| WO | 0041427 A2 | 7/2000 |
| WO | 2010116621 A1 | 10/2010 |

OTHER PUBLICATIONS

Digital cellular telecommunications system (Phase 2+); Universal Mobile Telecommunications System (UMTS); LTE; 3GPP System Architecture Evolution (SAE); Security architecture (3GPP TS 33.401 version 12.14.0 Release 12), Technical Specification, European Telecommunications Standards Institute (ETSI), 650, Route Des Lucioles ; F-06921 Sophia-Antipolis; France, vol. 3GPP SA 3, No. VI2.14.0, Apr. 2015 (Apr. 2015).

(Continued)

*Primary Examiner* — Minjung Kim

(57) ABSTRACT

According to an aspect, there is provided a method of operating a first radio access node in a communication network, the method comprising determining whether a first base key that is used to determine a first encryption key for encrypting communications between a communication device and the first radio access node can be used by a second radio access node for determining a second encryption key for encrypting communications between the communication device and the second radio access node; and if the first base key can be used by the second radio access (Continued)

node, sending the first base key to the second radio access node during handover of the communication device from the first radio access node to the second radio access node.

9 Claims, 11 Drawing Sheets

(51) Int. Cl.
    *H04W 12/04*     (2021.01)
    *H01P 5/107*     (2006.01)
    *H01P 1/20*     (2006.01)
    *H01P 3/12*     (2006.01)
    *H04W 88/02*     (2009.01)
    *H04W 88/08*     (2009.01)
    *H04W 92/20*     (2009.01)

(52) U.S. Cl.
    CPC .......... *H01P 5/107* (2013.01); *H04W 12/0401* (2019.01); *H04W 36/08* (2013.01); *H04W 88/02* (2013.01); *H04W 88/08* (2013.01); *H04W 92/20* (2013.01)

(56) References Cited

U.S. PATENT DOCUMENTS

| | | | |
|---|---|---|---|
| 2009/0041247 A1* | 2/2009 | Barany | H04L 63/06 380/270 |
| 2009/0220087 A1* | 9/2009 | Brusilovsky | H04L 63/062 380/272 |
| 2009/0307496 A1* | 12/2009 | Hahn | H04L 63/0428 713/171 |

OTHER PUBLICATIONS

SAMSUNG: "Discussion on alternatives for Key Handling during Active mode mobility", 3GPP DRAFT; 33-070800-Sam-Active-Keyhandling, 3rd Generation Partnership Project (3GPP), Mobile Competence Centre; 650, Route Des Lucioles ; F-06921 Sophia-Antipolis Cedex; France, vol. SA WG3, No. Munich; Oct. 2, 2007, Oct. 2, 2007 (Oct. 2, 2007), XP050280240.

* cited by examiner

NODES FOR USE IN A COMMUNICATION NETWORK AND METHODS OF OPERATING THE SAME

This application claims the benefit of U.S. Provisional Application No. 62/238,966, filed Oct. 8, 2015, the disclosure of which is fully incorporated herein by reference.

TECHNICAL FIELD

This document relates to a communication network, and in particular to techniques relating to the handover of a terminal device between radio access nodes in the communication network.

BACKGROUND

In Long Term Evolution (LTE) communication networks, the communications between the user equipment (UE) and an eNB are encrypted and partially integrity protected. The integrity and encryption keys are derived from a common root key called the $K_{eNB}$ which is shared between the UE and the eNB. The $K_{eNB}$ is unique to the UE-PCell pair, where PCell is the primary cell that the UE uses as a 'master' cell when communicating with an eNB. Since the UE only uses one PCell for communicating with an eNB, the $K_{eNB}$ is also unique for the UE-eNB pair. That is, the same $K_{eNB}$ is never used to protect the traffic between the UE and two different eNBs. The rationale behind this design is to prevent an attacker that has gained access to or knowledge of a $K_{eNB}$ that is used between a UE and a first eNB to have any use for that $K_{eNB}$ when attempting to break encryption or integrity on traffic between the UE and a different eNB.

To ensure that the $K_{eNB}$ is unique per UE-eNB pair, $K_{eNB}$ is changed during handover between two eNBs. For simplicity, $K_{eNB}$ is actually changed on all intra-LTE handovers (e.g. handover between cells), even when the source eNB and target eNB is the same node.

The uniqueness of the UE-$K_{eNB}$ pair during handover is achieved by the fact that the UE and source eNB derive a new $K_{eNB}$ (denoted $K_{eNB}^*$) from the current $K_{eNB}$, the Physical Cell Identifier (PCI) of the target primary cell (PCell) and the target physical cell downlink frequency (e.g. the Evolved Absolute Radio Frequency Channel Number for the downlink, EARFCN-DL). This is specified in clause 7.2.8 of 3GPP TS 33.401 "3GPP System Architecture Evolution (SAE); Security architecture", version 12.14.0 (2015-03).

More specifically, the input to the key derivation function (KDF) to derive $K_{eNB}^*$ is:
FC=0x13
P0=PCI (target PCI)
L0=length of PCI (i.e. 0x00 0x02)
P1=EARFCN-DL (target physical cell downlink frequency)
L1 length of EARFCN-DL (i.e. 0x00 0x02)

A handover between two eNBs without core network involvement, a so-called X2 handover, is described below with reference to FIG. 1. Handovers can be performed after the UE has completed all necessary procedures to activate Radio Resource Control (RRC) and Non-Access Stratum (NAS) security. The X2 handover is initiated by the source eNB 2 calculating a $K_{eNB}^*$ key from the currently active $K_{eNB}$, shared between the source eNB 2 and the UE 3, and sending it together with the UE security capabilities to the target eNB 4 in a handover request message 5. The target eNB 4 replies with the required configuration information 5 for the UE connection. This information includes the chosen algorithms that the target eNB 4 and the UE 3 shall use. The source eNB 2 then forwards the reply to the UE 3 (signal 6), and the UE 3 confirms the handover with a completion message 7 to the target eNB 4. In the last step, the target eNB 4 retrieves a new key called the Next Hop key (NH) from a Mobility Management Entity (MME). The NH is derived from a key $K_{ASME}$ (a base key that is shared by the UE and MME) and the NH is used as a basis for the calculation of $K_{eNB}^*$ in the next handover event.

In some scenarios the source eNB doesn't have a "fresh" NH key when performing a handover, and instead the eNB can create a new $K_{eNB}^*$ from the current $K_{eNB}$. This is called a vertical key derivation. An NH key is referred to as being "fresh" when it has not previously been used.

The $K_{eNB}^*$ key itself is not sent from the eNB to the UE, and instead an information element (IE) indicating whether the $K_{eNB}^*$ is derived vertically (i.e. a fresh NH exists) or horizontally (no new NH exists in the eNB) is sent to the UE. This is information element is called NCC (Next-hop Chaining Counter) and is included in the RRC reconfiguration message. The NCC is a value between 0-7. If the NCC is stepped, then the UE knows that a vertical key derivation shall be performed, and when the NCC is the same as the NCC associated with the currently active $K_{eNB}$, the UE will instead perform a horizontal key derivation.

A trend in today's networks is for the operator to add more frequencies and reduce the size of cells to increase the capacity of mobile broadband. This leads to an increase in UE reconfigurations and mobility actions.

The ability to quickly move or resume a UE session between cells becomes increasingly more important in order to fit the traffic patterns associated with short data bursts. However, since the encryption and integrity keys are derived from a base key ($K_{eNB}$) that is tied to the primary cell (via the use of the EARFCN-DL of the primary cell and the PCI in the derivation of the key $K_{eNB}$), each time the UE moves from that PCell or reconnects in another PCell a key renegotiation must be performed before traffic can resume. This causes a problem since re-negotiation of the $K_{eNB}$ consumes considerable processor cycles and memory, and in particular results in the encryption and integrity keys having to be derived from the new $K_{eNB}$. When the encryption key is updated, some already encrypted packets must be buffered, decrypted using the old encryption key and then re-encrypted using the new encryption key. An analogous problem is that already integrity protected packets similarly need to be re-protected using the new integrity protection key. This adds delay that reduces the end-user experience. Moreover, it complicates the implementation of the eNB, leading to increased risk for implementation errors and increased cost for code maintenance.

The problem above is described in the context of the way security is handled in LTE, although the problem may also be evident in other types of communication networks. It will be appreciated that the need to optimise security processing is common to many different types of network.

Therefore there is a need for improvements in the way in which security is handled when a handover occurs between two eNBs.

SUMMARY

According to a first aspect, there is provided a method of operating a first radio access node in a communication network. The method comprises determining whether a first base key that is used to determine a first encryption key for encrypting communications between a communication device and the first radio access node can be used by a second radio access node for determining a second encryption key for encrypting communications between the communication device and the second radio access node; and if the first base key can be used by the second radio access node, sending the first base key to the second radio access node during handover of the communication device from the first radio access node to the second radio access node.

According to a second aspect, there is provided a first radio access node for use in a communication network. The first radio access node is adapted or configured to (or comprises one or more modules configured to) determine whether a first base key that is used to determine a first encryption key for encrypting communications between a communication device and the first radio access node can be used by a second radio access node for determining a second encryption key for encrypting communications between the communication device and the second radio access node; and send the first base key to the second radio access node during handover of the communication device from the first radio access node to the second radio access node if the first base key can be used by the second radio access node.

According to a third aspect, there is provided a first radio access node for use in a communication network. The first radio access node comprises a processor and a memory, said memory containing instructions executable by said processor whereby said first radio access node is operative to perform the method according to the first aspect set out above.

According to a fourth aspect, there is provided a method of operating a communication device. The method comprises, on handover of the communication device from a first radio access node in a communication network to a second radio access node in the communication network, receiving an indication of whether a first base key that was used to determine a first encryption key for encrypting communications between the communication device and the first radio access node can be used for determining a second encryption key for encrypting communications between the communication device and the second radio access node; if the received indication indicates that the first base key can be used for determining a second encryption key for encrypting communications between the communication device and the second radio access node, determining a second encryption key for encrypting communications between the communication device and the second radio access node from the first base key; otherwise, determining a second base key from the first base key; and determining a second encryption key for encrypting communications between the communication device and the second radio access node from the second base key.

According to a fifth aspect, there is provided a communication device. The communication device is adapted or configured to (or comprises one or more modules configured to) receive an indication of whether a first base key that was used to determine a first encryption key for encrypting communications between the communication device and a first radio access node in a communication network can be used for determining a second encryption key for encrypting communications between the communication device and a second radio access node in the communication network on handover of the communication device from the first radio access node to the second radio access node; determine a second encryption key from the first base key if the received indication indicates that the first base key can be used for determining a second encryption key; determine a second base key from the first base key if the received indication does not indicate that the first base key can be used for determining a second encryption key; and determine a second encryption key for encrypting communications between the communication device and the second radio access node from the second base key.

According to a sixth aspect, there is provided another communication device. The communication device comprises a processor and a memory, said memory containing instructions executable by said processor whereby said communication device is operative to perform the method according to the fourth aspect set out above.

According to a seventh aspect, there is provided a method of operating a second radio access node in a communication network. The method comprises receiving a first base key from a first radio access node in the communication network during handover of a communication device from the first radio access node to the second radio access node; receiving from the first radio access node an indication of an encryption key generation algorithm to use to determine a first encryption key from the first base key; and determining the first encryption key for encrypting communications between the communication device and the second radio access node from the first base key using the indicated encryption key generation algorithm.

According to an eighth aspect, there is provided a second radio access node for use in a communication network. The second radio access node is adapted or configured to (or comprises one or more modules configured to) receive a first base key from a first radio access node in the communication network during handover of a communication device from the first radio access node to the second radio access node; receive from the first radio access node an indication of an encryption key generation algorithm to use to determine a first encryption key from the first base key; and determine the first encryption key for encrypting communications between the communication device and the second radio access node from the first base key using the indicated encryption key generation algorithm.

According to a ninth aspect, there is provided a second radio access node. The second radio access node comprises a processor and a memory, said memory containing instructions executable by said processor whereby said second radio access node is operative to perform the method according to the seventh aspect set out above.

According to a tenth aspect, there is provided a method of operating a node in a communication network. The method comprises receiving a request from a first radio access node in the communication network for information on a second radio access node in the communication network, the information relating to whether a first base key that was used to determine a first encryption key for encrypting communications between a communication device and the first radio access node can be used for determining a second encryption key for encrypting communications between the communication device and the second radio access node; and sending information on the second radio access node to the first radio access node, the information indicating whether the first base key can be used by the second radio access node.

According to an eleventh aspect, there is provided a node for use in a communication network. The node is adapted or configured to (or comprises one or more modules configured to) receive a request from a first radio access node in the communication network for information on a second radio access node in the communication network, the information relating to whether a first base key that was used to determine a first encryption key for encrypting communications between a communication device and the first radio access node can be used for determining a second encryption key for encrypting communications between the communication device and the second radio access node; and send information on the second radio access node to the first radio access node, the information indicating whether the first base key can be used by the second radio access node.

According to a twelfth aspect, there is provided a node for use in a communication network. The node comprises a processor and a memory, said memory containing instructions executable by said processor whereby said node is operative to perform the method according to the tenth aspect set out above.

According to a thirteenth aspect, there is provided a computer program product comprising a computer readable medium having computer readable code embodied therein, the computer readable code being configured such that, on execution by a suitable computer or processor, the computer or processor is caused to perform any of the method aspects set out above.

Particular embodiments may incorporate one or more of the aspects provided above and elements of certain aspects may be combined.

BRIEF DESCRIPTION OF THE DRAWINGS

Some embodiments of the techniques introduced in this document are described below with reference to the following figures, in which.

DETAILED DESCRIPTION

Figure 1:
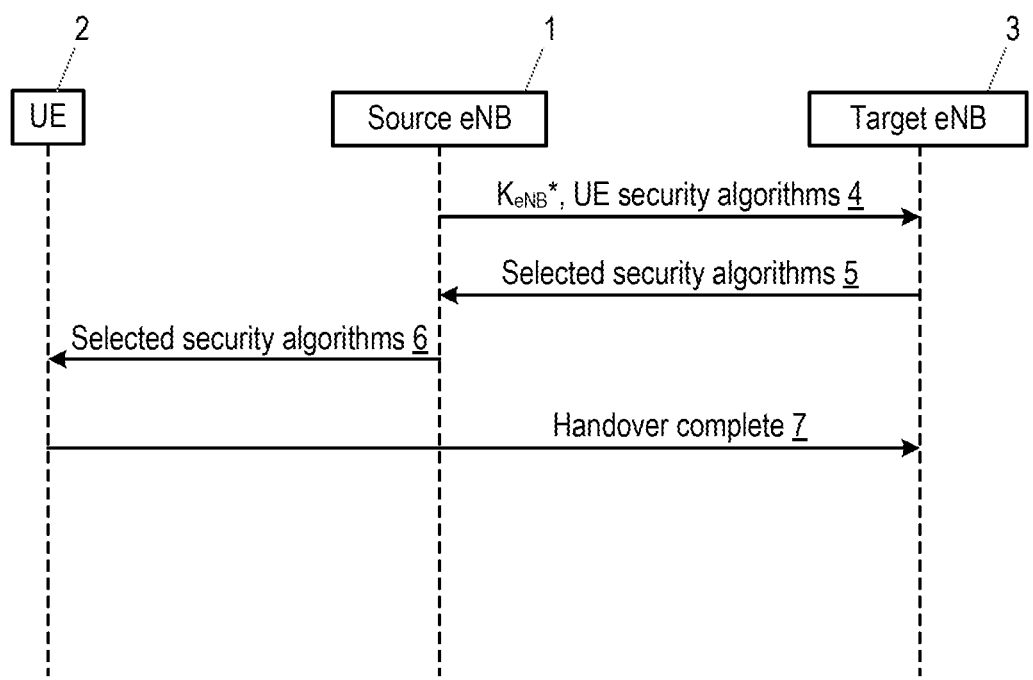
FIG. 1 illustrates the signalling in a handover between a source eNB and a target eNB in an LTE network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

Although in the description below the term user equipment (UE) is used, it should be understood by the skilled in the art that "UE" is a non-limiting term comprising any mobile device, communication device, wireless communication device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE", the general terms "terminal device", "communication device" and "wireless communication device" are used in the following description, and it will be appreciated that such a device may or may not be 'mobile' in the sense that it is carried by a user.

Instead, the term "terminal device" (and the alternative general terms set out above) encompasses any device that is capable of communicating with communication networks that operate according to one or more mobile communication standards, such as the Global System for Mobile communications, GSM, Universal Mobile Telecommunications System (UMTS), Long-Term Evolution, LTE, etc. It will also be appreciated that a UE may comprise a Universal Subscription Identity Module (USIM) on a smart-card or implemented directly in the UE, e.g., as software or as an integrated circuit. The operations described herein may be partly or fully implemented in the USIM or outside of the USIM.

One or more cells are associated with a base station, where a base station comprises in a general sense any network node transmitting radio signals in the downlink and/or receiving radio signals in the uplink. Some example base stations, or terms used for describing base stations, are eNodeB, eNB, NodeB, macro/micro/pico/femto radio base station, home eNodeB (also known as femto base station), relay, repeater, sensor, transmitting-only radio nodes or receiving-only radio nodes. A base station may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band modules for different RATs.

Unless otherwise indicated herein, the signalling described is either via direct links or logical links (e.g. via higher layer protocols and/or via one or more network nodes).

Figure 2:
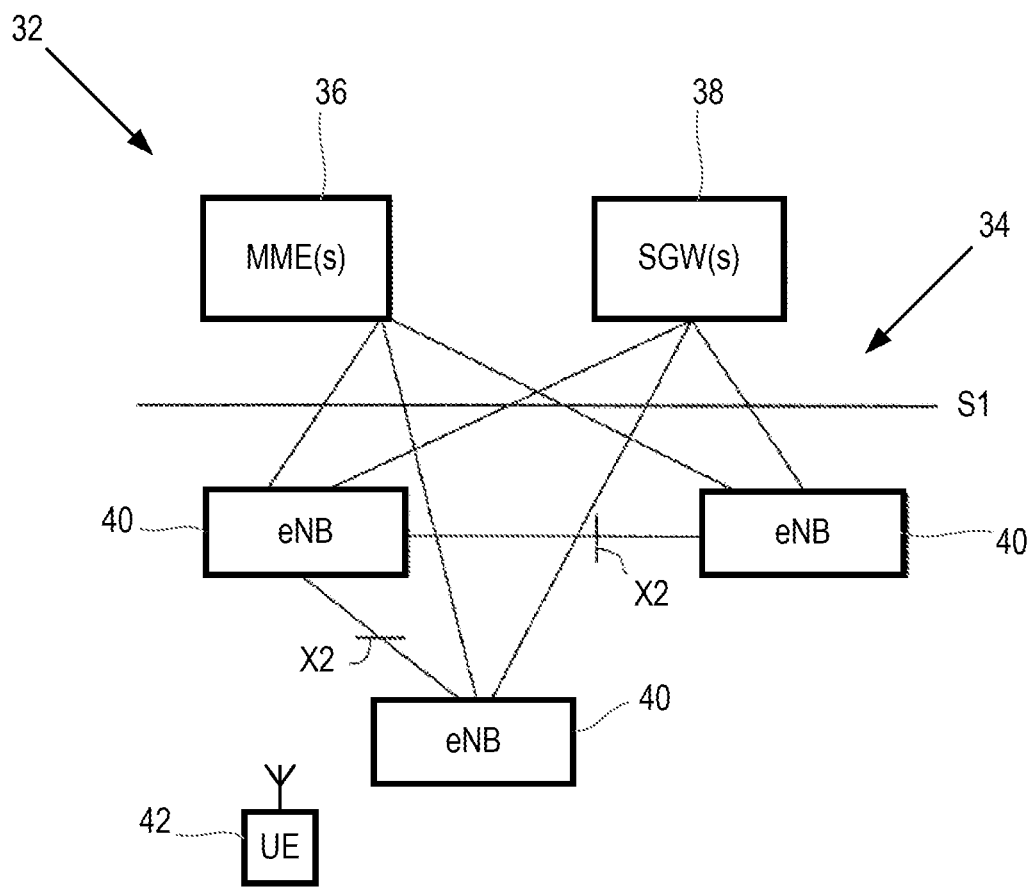
FIG. 2 is a non-limiting example block diagram of a LTE cellular communications network.

FIG. 2 shows an example diagram of an evolved Universal Mobile Telecommunications System (UMTS) Terrestrial Radio Access Network (E-UTRAN) architecture as part of an LTE-based communications system 32 to which the techniques described herein can be applied. Nodes in a core network 34 part of the system 32 include one or more Mobility Management Entities (MMEs) 36, a key control node for the LTE access network, and one or more Serving Gateways (SGWs) 38 which route and forward user data packets while acting as a mobility anchor. They communicate with base stations or radio access nodes 40 referred to in LTE as eNBs, over an interface, for example an S1 interface. The eNBs 40 can include the same or different categories of eNBs, e.g. macro eNBs, and/or micro/pico/femto eNBs. The eNBs 40 communicate with each other over an inter-node interface, for example an X2 interface. The S1 interface and X2 interface are defined in the LTE standard. A UE 42 is shown, and a UE 42 can receive downlink data from and send uplink data to one of the base stations 40, with that base station 40 being referred to as the serving base station of the UE 42.

Figure 3:
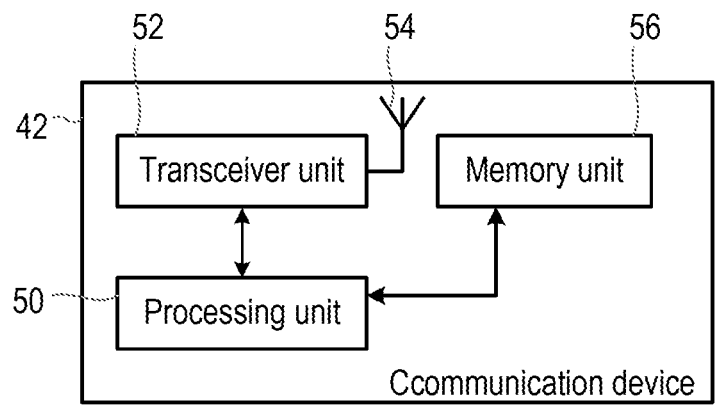
FIG. 3 is a block diagram of a communication device according to an embodiment.

FIG. 3 shows a communication device/terminal device (UE) 42 that can be adapted or configured to operate according to one or more of the non-limiting example embodiments described. The UE 42 comprises a processor or processing unit 50 that controls the operation of the UE 42. The processing unit 50 is connected to a transceiver unit 52 (which comprises a receiver and a transmitter) with associated antenna(s) 54 which are used to transmit signals to and receive signals from a radio access node 40 in the network 32. The UE 42 also comprises a memory or memory unit 56 that is connected to the processing unit 50 and that contains instructions or computer code executable by the processing unit 50 and other information or data required for the operation of the UE 42.

Figure 4:
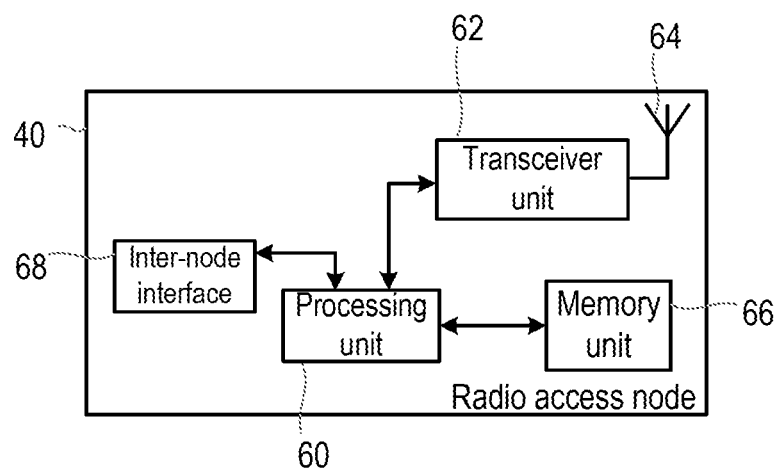
FIG. 4 is a block diagram of a radio access node according to an embodiment.

FIG. 4 shows a radio access node (for example a cellular network base station such as a NodeB or an eNodeB, eNB) 40 that can be adapted or configured to operate according to the example embodiments described. The radio access node 40 comprises a processor or processing unit 60 that controls the operation of the radio access node 40. The processing unit 60 is connected to a transceiver unit 62 (which comprises a receiver and a transmitter) with associated antenna (s) 64 which are used to transmit signals to, and receive signals from, UEs 42 in the network 32. The radio access node 40 also comprises a memory or memory unit 66 that is connected to the processing unit 60 and that contains instructions or computer code executable by the processing unit 60 and other information or data required for the operation of the radio access node 40. The radio access node 40 also includes components and/or circuitry 68 for allowing the radio access node 40 to exchange information with another radio access node 40 (for example via an X2 interface), and/or with a core network node 36, 38 (for example via an S1 interface). It will be appreciated that base stations for use in other types of network (e.g. UTRAN or WCDMA RAN) will include similar components to those shown in FIG. 4 and appropriate interface circuitry 68 for enabling communications with the other radio access nodes in those types of networks (e.g. other base stations, mobility management nodes and/or nodes in the core network). It will be appreciated that a radio access node 40 can be implemented as a number of distributed functions in the radio access network (RAN).

Figure 5:
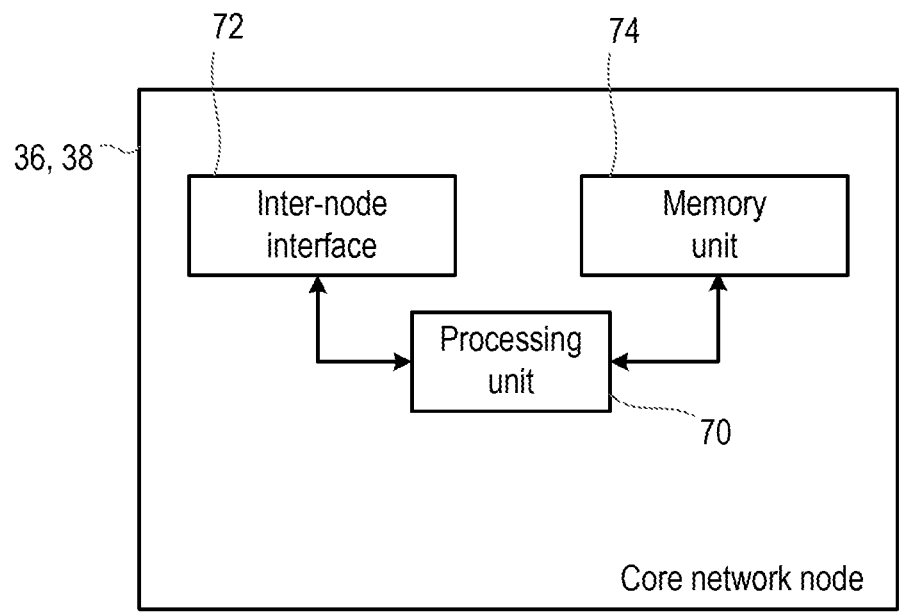
FIG. 5 is a block diagram of a core network node according to an embodiment.

FIG. 5 shows a core network node 36, 38 that can be used in the example embodiments described. The node 36, 38 could be an MME 36, an SGW 38, or another type of core network node (e.g. a radio network controller, RNC). The node 36, 38 comprises a processing unit 70 that controls the operation of the node 36, 38. The processing unit 70 is connected to interface components and/or circuitry 72 for allowing the node 36, 38 to exchange information with network nodes in the radio access network (RAN), for example radio access nodes 40, which it is associated (which is typically via the S1 interface) and/or with other nodes in the core network part of the network. The node 36, 38 also comprises a memory unit 74 that is connected to the processing unit 70 and that stores program and other information and data required for the operation of the node 36, 38.

It will be appreciated that only the components of the UE 42, radio access node 40 and network node 36, 38 described and presented in context of the embodiments disclosed herein are illustrated in FIGS. 3, 4 and 5.

Although the embodiments of the present disclosure will mainly be described in the context of LTE, it will be appreciated by those skilled in the art that the problems and solutions described herein are equally applicable to other types of wireless access networks and user equipments (UEs) implementing other access technologies and standards, and thus LTE (and the other LTE specific terminology used herein) should only be seen as examples of the technologies to which the techniques can be applied.

As noted above, there are problems with the current handling of security in an LTE communication network, particularly relating to handling of security during the handover procedure between eNBs. The techniques provided below therefore provide improvements in the way in which security is handled when a handover occurs between selected eNBs.

In particular the techniques described herein provide that the same base key (e.g. $K_{eNB}$) can be used after a switch (handover) from one PCell to another if the continued use of the $K_{eNB}$ is considered secure. If the $K_{eNB}$ can be used after a switch, signalling is provided from the source eNB or target eNB to indicate to the UE that the UE should keep using the same $K_{eNB}$ after the handover.

In particular embodiments, it can be considered secure to keep using the $K_{eNB}$ after a handover if the source eNB and the target eNB are part of the same 'security zone'. A 'security zone' can be defined as a set of eNBs that are configured or arranged in such a way that if an attacker was to hack, access or otherwise break in to one of the eNBs in the set, the attacker would also be able to hack, access or otherwise break in to one of the others without substantial extra effort. For example a radio access network (RAN) can be 'cloudified', where multiple eNBs can be run as separate virtual machines on the same hardware. In this case, an attacker that gains access to the hardware can gain access to any or all of the eNBs running on that hardware. In an alternative 'cloudified' RAN, multiple eNBs can be implemented in respective containers within the same virtual machine. Again, an attacker that gains access to the virtual machine can access any of all of the eNBs being run by that virtual machine. A further example of eNBs being considered to be within a security zone is when eNBs are implemented on respective circuit/component boards in the same physical computer rack. Generally, a security zone can be considered as a set of eNBs that are in the same physical and/or virtual location. Alternatively, the eNBs that are part of a particular 'security zone' can be configured or selected by the operator of the network, for example based on an assessment of the risk of network security being compromised if an eNB in the zone is hacked or accessed.

Figure 6:
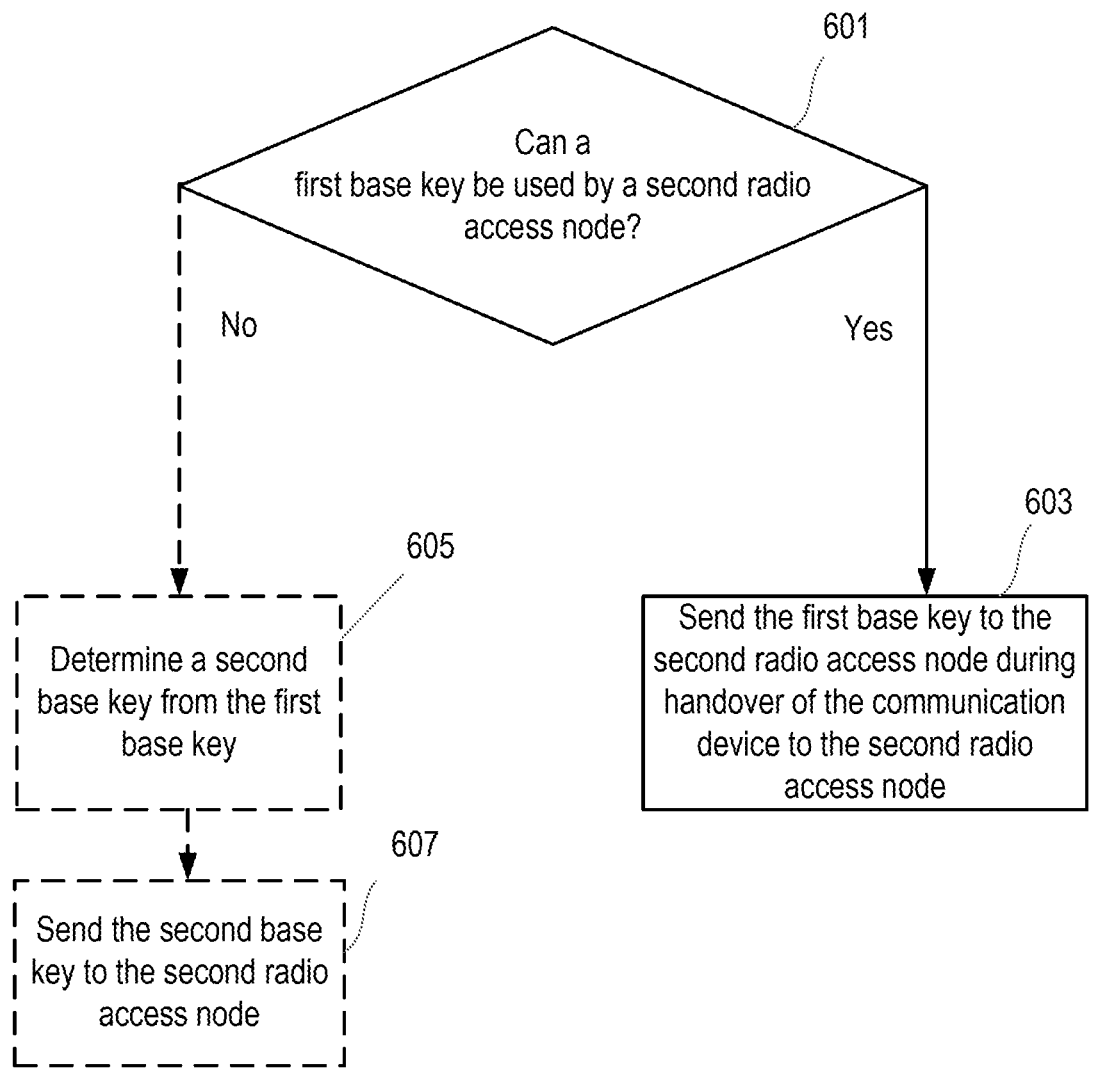
FIG. 6 is a flow chart illustrating a method of operating a radio access node according to an embodiment.

An exemplary method of operating a radio access node (e.g. an eNB in an LTE network) 40 according to the techniques described herein is shown in FIG. 6. The radio access node 40 is also referred to as the 'first' radio access node below). In this method, the first radio access node 40 is the SourceCell for a communication device (e.g. a UE) 42.

In a first step, step 601, the first radio access node 40 determines whether a first base key, referred to as a first AS-base key (e.g. a $K_{eNB}$) below that is used to determine a first encryption key for encrypting communications between the communication device and the first radio access node 40 can be used by a second radio access node 40 for determining a second encryption key for encrypting communications between the communication device and the second radio access node.

In some embodiments step 601 comprises determining that the first base key can be used by the second radio access node if the first radio access node and the second radio access node are part of the same security zone. In some embodiments, the first radio access node and the second radio access node are part of the same security zone if the first radio access node and the second radio access node are: (a) running as separate virtual machines on the same hardware; (b) two containers within the same virtual machine; (c) implemented on boards in the same physical rack; (d) determined by a security policy as belonging to the same security zone; or (e) physically located in the same site.

Step 601 can be performed by examining a list or local configuration at the first radio access node, or by requesting information from another node (for example as described below with reference to FIG. 9). In this respect, step 601 can further comprise sending a request for information on the second radio access node to another node in the communication network (e.g. another radio access node, eNB, or a node in the core network, e.g. an MME 36), and receiving a reply to that request that contains information on the second radio access node. The information may indicate whether the first base key can be used by the second radio access node, or the information may allow the first radio access node 40 to determine whether the first base key can be used by the second radio access node.

If at step 601 it is determined that the first base key can be used by the second radio access node, the method further comprises the step of sending the first base key to the second radio access node during handover of the communication device from the first radio access node to the second radio access node (step 603).

In addition, although not shown in FIG. 6, if the first base key can be used by the second radio access node, the first radio access node also sends an indication to the communication device that the first base key is to be used for determining a second encryption key for encrypting communications between the communication device and the second radio access node. This indication can be included in a message relating to the handover of the communication device from the first radio access node to the second radio access node. The message can be a Radio Resource Control, RRC, Reconfiguration message.

If in step 601 it is determined that the first base key cannot be used by the second radio access node, the first radio access node 40 determines a second base key from the first base key (step 605). This key derivation can be carried out in a conventional way (e.g. using horizontal or vertical key derivation). The first radio access node 40 then sends the second base key to the second radio access node during handover of the communication device from the first radio access node to the second radio access node (step 607). In this case the first radio access node 40 can also send an indication to the communication device to cause the communication device to determine a second base key from the first base key for use with the second radio access node.

In some embodiments, the first radio access node 40 can also send an indication of an encryption key generation algorithm that was used to determine the first encryption key from the first base key to the second radio access node 40.

As noted below, in some embodiments the first radio access node and the second radio access node can share a PDCP function or state.

Figure 7:
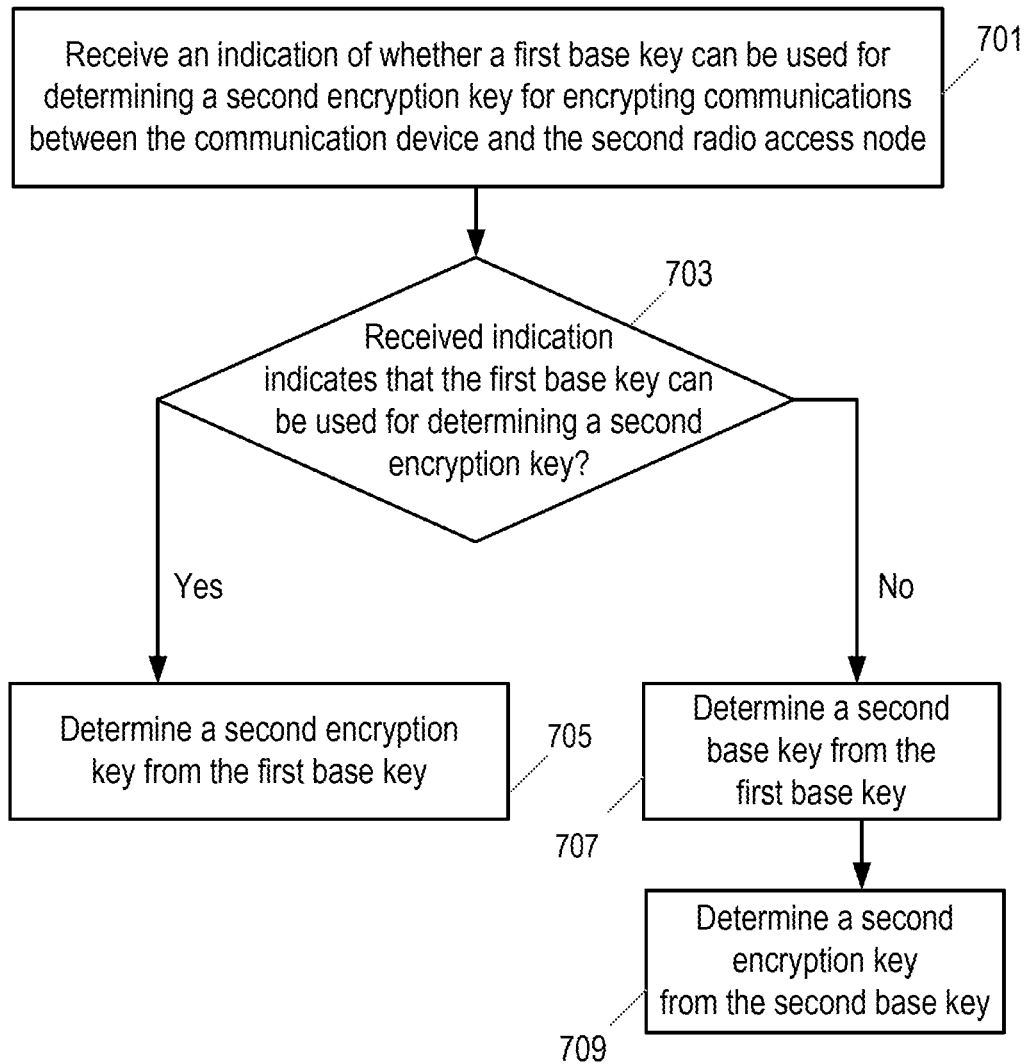
FIG. 7 is a flow chart illustrating a method of operating a communication device according to an embodiment.

FIG. 7 illustrates a method of operating a communication device (e.g. a UE) 42 according to the techniques presented herein. The communication device 42 is being served by a first radio access node 40 (e.g. an eNB).

In a first step, step 701, on handover of the communication device from a first radio access node (e.g. eNB) 40 to a second radio access node (e.g. eNB) 40, the communication device receives an indication of whether a first base key that was used to determine a first encryption key for encrypting communications between the communication device and the first radio access node can be used for determining a second encryption key for encrypting communications between the communication device and the second radio access node.

This indication can be received from the first radio access node 40 or the second radio access node 40.

If the received indication indicates that the first base key can be used for determining a second encryption key (at step 703), the communication device 42 determines a second encryption key from the first base key (step 705). This second encryption key can then be used to encrypt communications between the communication device and the second radio access node.

If the received indication indicates that the first base key cannot be used for determining a second encryption key (at step 703), the communication device determines a second base key from the first base key (step 707). This second base key can be derived in a conventional way, e.g. using horizontal or vertical key derivation.

The communication device 42 then determines a second encryption key for encrypting communications between the communication device and the second radio access node from the second base key (step 709).

In some embodiments, the indication received in step 701 is in a message relating to the handover of the communication device from the first radio access node to the second radio access node. The message can be a Radio Resource Control, RRC, Reconfiguration message.

Figure 8:
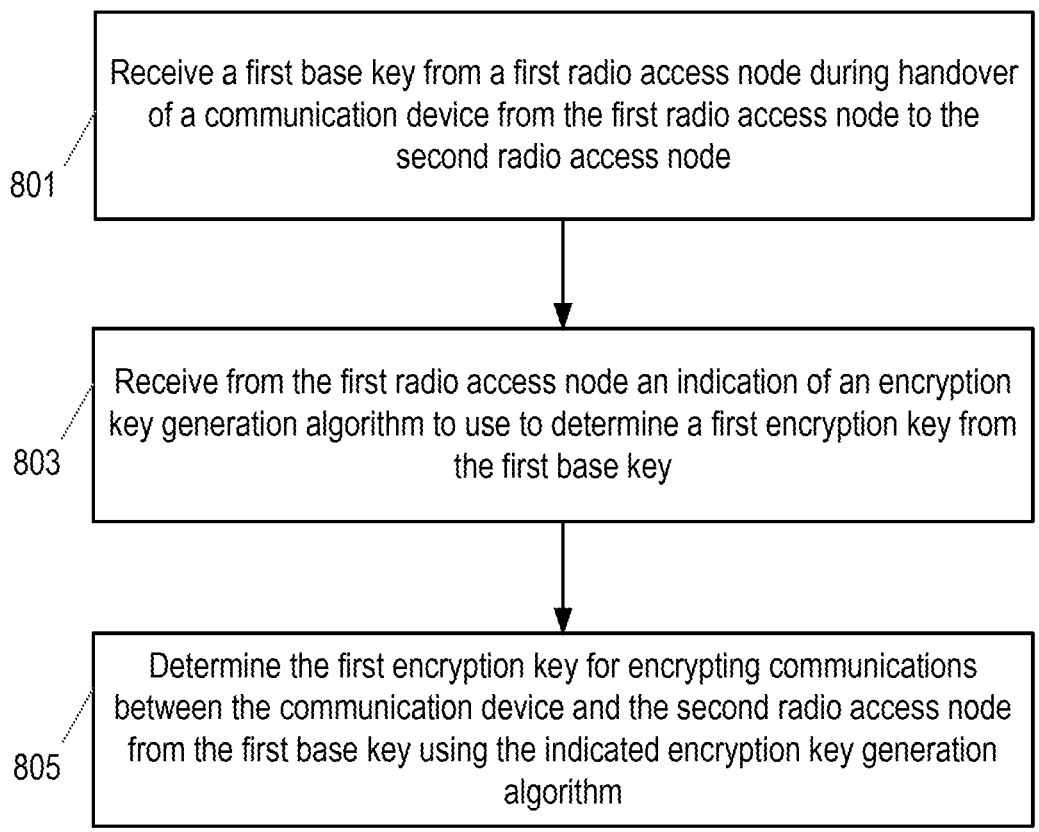
FIG. 8 is a flow chart illustrating a method of operating a radio access node according to another embodiment.

A method of operating a radio access node (e.g. an eNB in an LTE network) 40 according to the techniques described herein is shown in FIG. 8. The radio access node 40 is also referred to as the 'second' radio access node below, and corresponds to the TargetCell for the communication device.

In a first step, step 901, the second radio access node 40 receives a first base key from a first radio access node 40 during handover of a communication device from the first radio access node to the second radio access node. The second radio access node 40 also receives from the first radio access node an indication of an encryption key generation algorithm that was used to determine a first encryption key from the first base key (step 903). The second radio access node 40 then uses the first base key and the indicated encryption key generation algorithm to determine an encryption key.

The first base key and indicated encryption key generation algorithm will have been previously used by the first radio access node to generate an encryption key for use in encrypting communications between the first radio access node and the communication device, and thus by determining an encryption key using the first base key and the indicated encryption key generation algorithm, the second radio access node 40 will generate the same encryption key as that used by the first radio access node 40.

Figure 9:
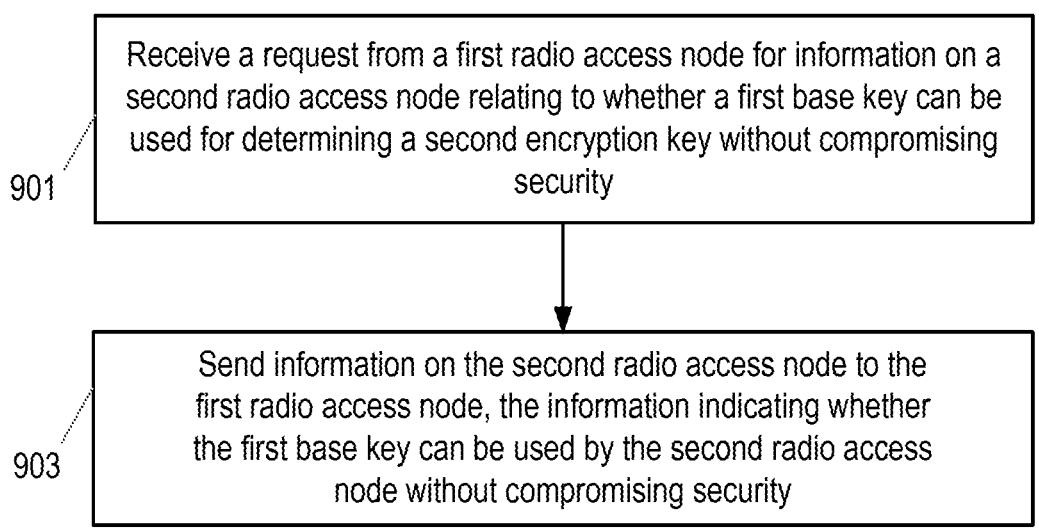
FIG. 9 is a flow chart illustrating a method of operating a node in a communication network according to an embodiment.

An exemplary method of operating a network node according to another embodiment of the techniques described herein is shown in FIG. 9. The node could be a node in the core network part of the communication network (and for example the node could be an MME 36), or a node in the RAN of the communication network (e.g. an eNB 40, or a function or component that is part of a distributed eNB architecture). This node can be responsible for making a decision on base key sharing and sending the decision to the requesting radio access node.

Thus, in a first step, step 901, the node receives a request from a first radio access node in the communication network for information on a second radio access node in the communication network. The requested information relates to whether a first base key that was used to determine a first encryption key for encrypting communications between a communication device and the first radio access node can be used for determining a second encryption key for encrypting communications between the communication device and the second radio access node.

The node retrieves or obtains the requested information and sends the information to the first radio access node 40 (step 903), the information indicating whether the first base key can be used by the second radio access node.

In some embodiments, after receiving the request for information, the node can determine whether the first base key can be used by a second radio access node. This determining can comprise the node determining that the first base key can be used by the second radio access node if the first radio access node and the second radio access node are part of the same security zone. The first radio access node and the second radio access node can be considered as part of the same security zone if the first radio access node and the second radio access node are: (a) running as separate virtual machines on the same hardware; (b) two containers within the same virtual machine; or (c) implemented on boards in the same physical rack; or (d) determined by security policy to belong to the same security zone; or (e) physically located in the same site.

Figure 10:
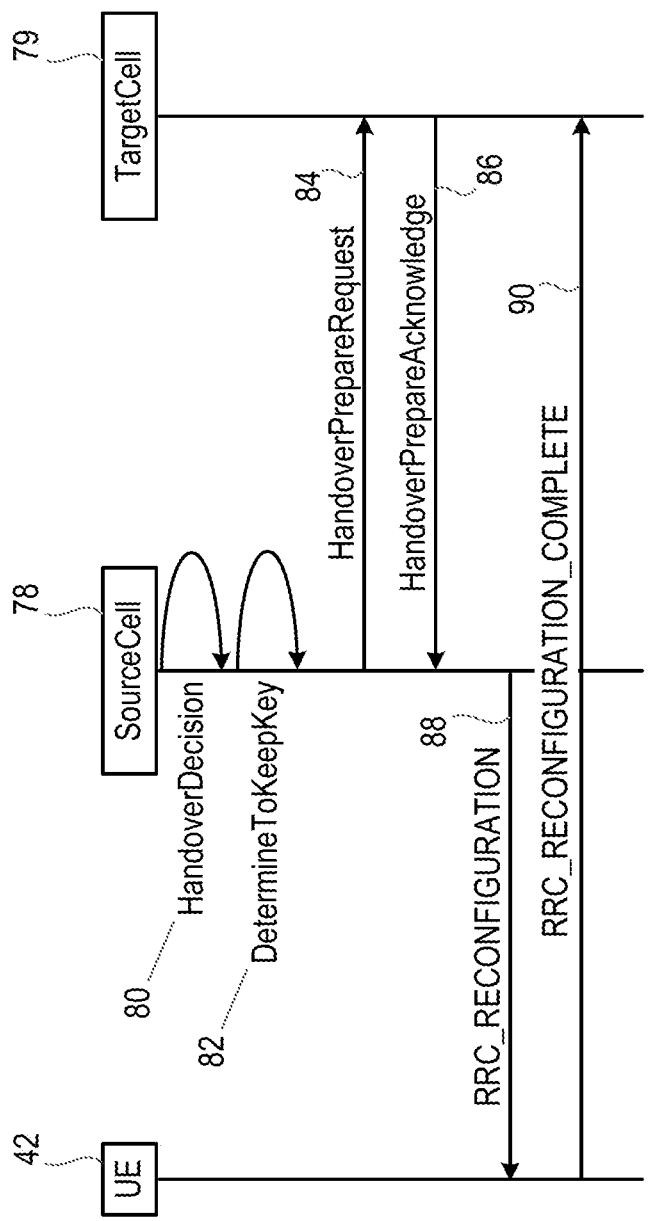
FIG. 10 illustrates an exemplary handover procedure in which the techniques described herein are used

A specific embodiment of the techniques presented herein in the context of an X2 handover in an LTE network is shown in FIG. 10. It should be noted that the principles described below can be applied to S1 handovers or other types of handovers that use similar security and/or messaging structures.

FIG. 10 shows the signalling involved in an X2 handover of a terminal device (UE 42) from a first radio access node 40 that is controlling a source master cell (denoted the 'SourceCell' 78 in FIG. 10), e.g. a first eNB 40, to a second radio access node 40 that is controlling a target master cell (denoted the 'TargetCell' 79 in FIG. 10), e.g. a second eNB 40. The term master cell here refers to a cell that the UE 42 needs to have established with an eNB 40 to be considered connected to that eNB 40, and could, for example, be a PCell (primary cell).

The structure of the X2 handover generally comprises the following steps: a node in the RAN (e.g. the SourceCell 40 in the example of FIG. 10) decides that a handover of the UE 42 should take place (step 80 in FIG. 10), the eNB supporting or hosting the SourceCell 78 requests the eNB 40 supporting or hosting the TargetCell 79 to prepare for the handover (step 84), the eNB 40 hosting the TargetCell 79 positively acknowledges the request (step 86), the eNB 40 hosting the SourceCell 78 requests the UE 42 to reconfigure the RRC connection for the TargetCell 79 (step 88), and finally the UE 42 completes the handover by informing the eNB 40 hosting the TargetCell 79 (step 90).

Thus, in step 80 a node in the RAN decides that the UE 42 needs to change from the SourceCell 78 to the TargetCell 79. In this example the node taking this decision is the eNB 40 hosting the SourceCell 78, although it is possible for the decision to be taken in a different node. The decision is typically taken due to coverage reasons, e.g. poor signal quality, but could be taken due to other reasons such as load in the cell. Step 80 is generally conventional and will not be described further.

Prior to requesting the eNB 40 hosting the TargetCell 79 to prepare for a handover (which is represented by the sending of HandoverPrepareRequest message 84 from the eNB 40 hosting the SourceCell 78 to the eNB 40 hosting the TargetCell 79), the eNB 40 hosting the SourceCell 78 determines whether the current AS-base key (used by the UE 42 and eNB 40 to derive encryption and integrity protection keys to protect the traffic transmitted in the SourceCell 78) can be used by the UE 42 and the eNB 40 hosting the TargetCell 79 without comprising security. This is shown as step 82 in FIG. 10 (DetermineToKeepKey). The AS-base key, for example $K_{eNB}$, is used for determining an encryption key for encrypting communications between the UE 42 and the eNB 40 hosting the SourceCell 78.

The decision in step 82 can be based on one or more factors, and in particular whether the eNB 40 hosting the TargetCell 79 is in the same 'security zone' as the eNB 40 hosting the SourceCell 78. A security zone is as defined above. The operator of the RAN may be able to configure the security zones (e.g. which cells or eNBs are in each security zone). There may be a list of cells/eNBs that are in each security zone (that each eNB 40 can be configured with or that can be accessed or queried by eNBs), and the decision in step 82 can comprise determining whether the TargetCell 79 is in the same list as the SourceCell 78. The cells/eNBs in each security zone can be identified in any of a number of ways, for example using specific PCIs, identifiers for eNBs 40 in the RAN, Internet Protocol (IP) addresses, Fully Qualified Domain Names (FQDNs) and/or media access control (MAC) addresses that are associated with each cell/eNB, and/or by ranges of names or addresses (e.g. any cell/eNB having an address in the specified range is considered to be part of the security zone.

As noted above with reference to FIGS. 6 and 9, although in some embodiments the eNB hosting the SourceCell 78 can make the decision on whether the eNB hosting the TargetCell 79 or the TargetCell 79 is in the same security zone as the eNB hosting SourceCell 78 or the SourceCell 78 itself (and therefore whether the $K_{eNB}$ can be used after the handover of the UE 42), in other embodiments the decision can be taken by another node in the communication network (e.g. another node in the RAN, or a node in the core network). In these embodiments, at step 82 the eNB hosting the SourceCell 78 can indicate to that node that the UE 42 may be handed-over to a TargetCell 79, the node can determine whether the SourceCell 78 and the TargetCell 79 are in the same security zone (e.g. by examining a list of cells/eNBs that are in the same security zone as the SourceCell 78), and provide an appropriate indication to the eNB hosting the SourceCell 78.

In addition to determining whether the TargetCell 79 is in the same security zone as the SourceCell 78, the eNB hosting the SourceCell 78 can further consider whether the UE supports the feature (i.e. the ability to use the $K_{eNB}$ from the SourceCell 78 in the TargetCell 79), and/or whether the eNB hosting the TargetCell 79 supports the feature (i.e. the ability to receive the $K_{eNB}$ and to use it for the UE 42). The eNB hosting the SourceCell 78 can determine whether the UE 42 supports the feature by examining the UE capabilities it receives as part of normal LTE operation. The eNB hosting the SourceCell 78 can determine whether the eNB hosting the TargetCell 79 supports the feature during X2 connection establishment or using RAN configuration data or during the handover procedure, for example.

If at step 82 the eNB hosting the SourceCell 78 determines that the currently active $K_{eNB}$ cannot also be used securely in the TargetCell 79 (i.e. using the current $K_{eNB}$ in the TargetCell 79 after the handover will compromise security), the handover will occur according to conventional techniques (e.g. as described above with reference to FIG. 1). That is, a new base key, denoted $K_{eNB}*$, is derived by the eNB hosting the SourceCell 78 for use by the eNB hosting the TargetCell 79 after the handover, and this new base key is sent to the eNB hosting the TargetCell 79.

Otherwise, if it is determined in step 82 that the currently active $K_{eNB}$ can be used by the eNB hosting the TargetCell 79 without compromising security, the eNB hosting the SourceCell 78 informs the eNB hosting the TargetCell 79 about the decision at the same time as providing the eNB hosting the TargetCell 79 with the $K_{eNB}$ in HandoverPrepareRequest message 84. This message 84 can also include the UE security capabilities, the value of the Packet Data Convergence Protocol (PDCP) COUNTs, and the identities of the radio bearer identifiers that have been used to construct Initialization Vectors for the encryption algorithm with the $K_{eNB}$.

When the eNB hosting the TargetCell 79 receives this information, the eNB hosting the TargetCell 79 does not perform any additional derivations on the received $K_{eNB}$ (which the eNB hosting the TargetCell 79 would otherwise have done according to the conventional handover procedure). These additional key derivations in the conventional LTE handover procedure refer to the derivation performed by the eNB hosting the TargetCell 79 in an S1-handover. In an S1-handover, the eNB hosting the TargetCell 79 receives keying material from the MME and then performs a derivation of that keying material together with the PCI and EARFCN-DL of the master TargetCell to arrive at the base key to for use in the TargetCell.

After the decision is made on whether to keep the $K_{eNB}$ after the handover has been made, the eNB hosting the SourceCell 78 directly or indirectly informs the UE 42 of the decision, i.e. whether the currently active $K_{eNB}$ should also be used with the TargetCell 79. The eNB hosting the SourceCell 78 can inform the UE 42 of this in a number of different ways.

In a first example, where the currently active $K_{eNB}$ should be kept after the handover, the eNB hosting the TargetCell 79 can create a handover command in which the eNB hosting the TargetCell 79 expresses that the currently active $K_{eNB}$ shall be used also after the handover (i.e. no horizontal or vertical key derivation shall occur) and that the same encryption algorithm shall continue to be used. The purpose of using the same encryption algorithm is to ensure that also the encryption key derived from the base key ($K_{eNB}$) remains the same before and after the handover. This may be desirable in accesses like LTE where the encryption key is bound to the encryption algorithm with which it is to be used via a key derivation. Any other parameters used in the derivation of the encryption key may also remain the same to ensure that the encryption key does not change at handover. The eNB hosting the TargetCell 79 can send the handover command to the eNB hosting the SourceCell 78 for further transmission to the UE 42 in the RRC Reconfiguration message 88.

In a second example, the eNB hosting the SourceCell 78 can include an indication of the decision that can be passed to the UE 42 together with the handover command in the RRC Reconfiguration message 88.

In a third example, rather than explicitly signal the result of the decision, the eNB hosting the SourceCell 78 can implicitly signal the result of the decision and whether the same encryption and integrity algorithms should be used via other combinations of information elements in the handover messages. For example, if NCC is not stepped and the UE 42 receives a value for a parameter that is currently unused according to the standards, the UE 42 may deduce that the currently active base key ($K_{eNB}$), and the integrity protection and encryption algorithm shall also be used in the TargetCell 79. One possible example of such an unused parameter value could be encryption algorithm number 7 (which is currently undefined in 3GPP TS 36.331 clause 6.3.3. If the NCC is stepped, it is not possible to re-use the $K_{eNB}$, since the stepping of the NCC indicates that the eNB hosting the SourceCell 78 has derived a $K_{eNB}*$ from a fresh NH key in a vertical derivation.

When the UE 42 receives the RRC Reconfiguration message 88 (that includes the handover command) it determines, based on the information in the message regarding the decision to reuse the base key ($K_{eNB}$) it uses with the eNB hosting the SourceCell 78, whether to perform a horizontal or vertical key derivation of the base key ($K_{eNB}$) to determine a new base key, $K_{eNB}*$, or whether to reuse the currently active $K_{eNB}$ for protecting the communications with the eNB hosting the TargetCell 79. In case a vertical or horizontal key derivation should be performed, the UE 42 will derive the base key ($K_{eNB}$*) in the conventional way as prescribed in LTE. However if the base key ($K_{eNB}$) should be reused, the UE 42 will continue use the currently active base key ($K_{eNB}$) also in the TargetCell 79.

In some embodiments the PDCP instance can be a function that is central to both the eNB hosting the SourceCell 78 and the eNB hosting the TargetCell 79, in which case the base key ($K_{eNB}$), PDCP COUNTS and used radio bearer identifiers do not need to be sent to the eNB hosting the TargetCell 79 by the eNB hosting the SourceCell 78, and it is only necessary for the eNB hosting the SourceCell 78 to send the eNB hosting the TargetCell 79 information that the base key ($K_{eNB}$) and encryption algorithm shall continue to be used.

Figure 11:
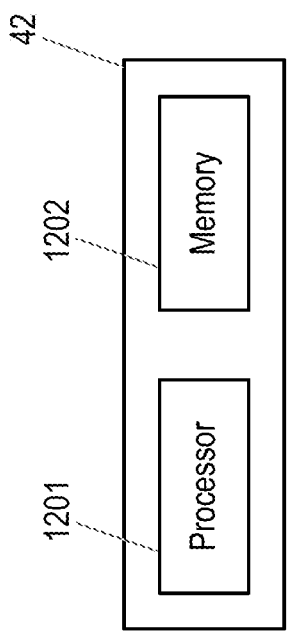
FIG. 11 is a block diagram of a first radio access node according to an embodiment.

FIG. 11 is a block diagram of a first radio access node 40 according to an embodiment. The first radio access node 40 is for use in a communication network 32 and comprises a processor 1101 and a memory 1102. The memory 1102 contains instructions executable by the processor 1101 such that the first radio access node 40 is operative to determine whether a first base key that is used to determine a first encryption key for encrypting communications between a communication device 42 and the first radio access node 40 can be used by a second radio access node 40 for determining a second encryption key for encrypting communications between the communication device 42 and the second radio access node 40, and send the first base key to the second radio access node 40 during handover of the communication device 42 from the first radio access node 40 to the second radio access node 40 if the first base key can be used by the second radio access node 40.

Figure 12:
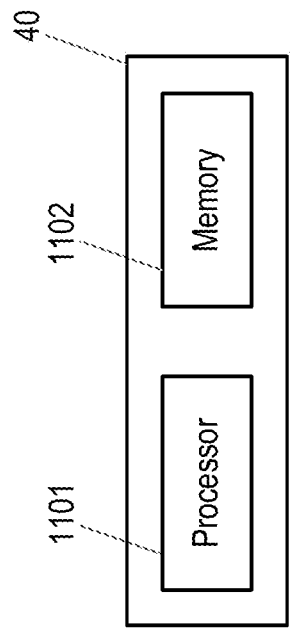
FIG. 12 is a block diagram of a communication device according to another embodiment.

FIG. 12 is a block diagram of a communication device 42 according to another embodiment. The communication device 42 comprises a processor 1201 and a memory 1202. The memory 1202 contains instructions executable by the processor 1201 whereby the communication device 42 is operative to receive an indication of whether a first base key that was used to determine a first encryption key for encrypting communications between the communication device 42 and a first radio access node 40 in a communication network 32 can be used for determining a second encryption key for encrypting communications between the communication device 42 and a second radio access node 40 in the communication network 32 on handover of the communication device 42 from the first radio access node 40 to the second radio access node 40; determine a second encryption key from the first base key if the received indication indicates that the first base key can be used for determining a second encryption key; determine a second base key from the first base key if the received indication does not indicate that the first base key can be used for determining a second encryption key; and determine a second encryption key for encrypting communications between the communication device 42 and the second radio access node 40 from the second base key.

Figure 13:
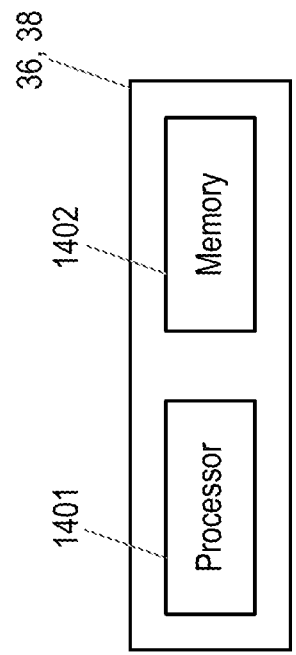
FIG. 13 is a block diagram of a second radio access node according to an embodiment.

FIG. 13 is a block diagram of a second radio access node 40 according to an embodiment. The second radio access node 40 is for use in a communication network 32 and comprises a processor 1301 and a memory 1302. The memory 1302 contains instructions executable by the processor 1301 such that the second radio access node 40 is operative to receive a first base key from a first radio access node 40 in the communication network 32 during handover of a communication device 42 from the first radio access node 40 to the second radio access node 40; receive from the first radio access node 40 an indication of an encryption key generation algorithm to use to determine a first encryption key from the first base key; and determine the first encryption key for encrypting communications between the communication device 42 and the second radio access node 42 from the first base key using the indicated encryption key generation algorithm.

Figure 14:
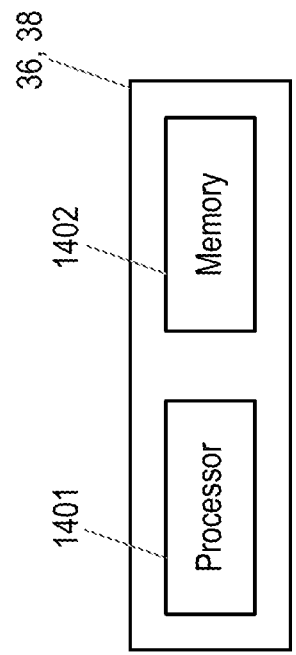
FIG. 14 is a block diagram of a node according to a further embodiment.

FIG. 14 is a block diagram of a node 36, 38 according to a further embodiment. The node 36, 38 is for use in a communication network 32, and the node 36, 38 comprises a processor 1401 and a memory 1402. The memory 1402 contains instructions executable by the processor 1401 such that the node 36, 38 is operative to receive a request from a first radio access node 40 in the communication network 32 for information on a second radio access node 40 in the communication network 32, the information relating to whether a first base key that was used to determine a first encryption key for encrypting communications between a communication device 42 and the first radio access node 40 can be used for determining a second encryption key for encrypting communications between the communication device 42 and the second radio access node 40; and send information on the second radio access node 40 to the first radio access node 40, the information indicating whether the first base key can be used by the second radio access node 40.

Figures 15, 16:
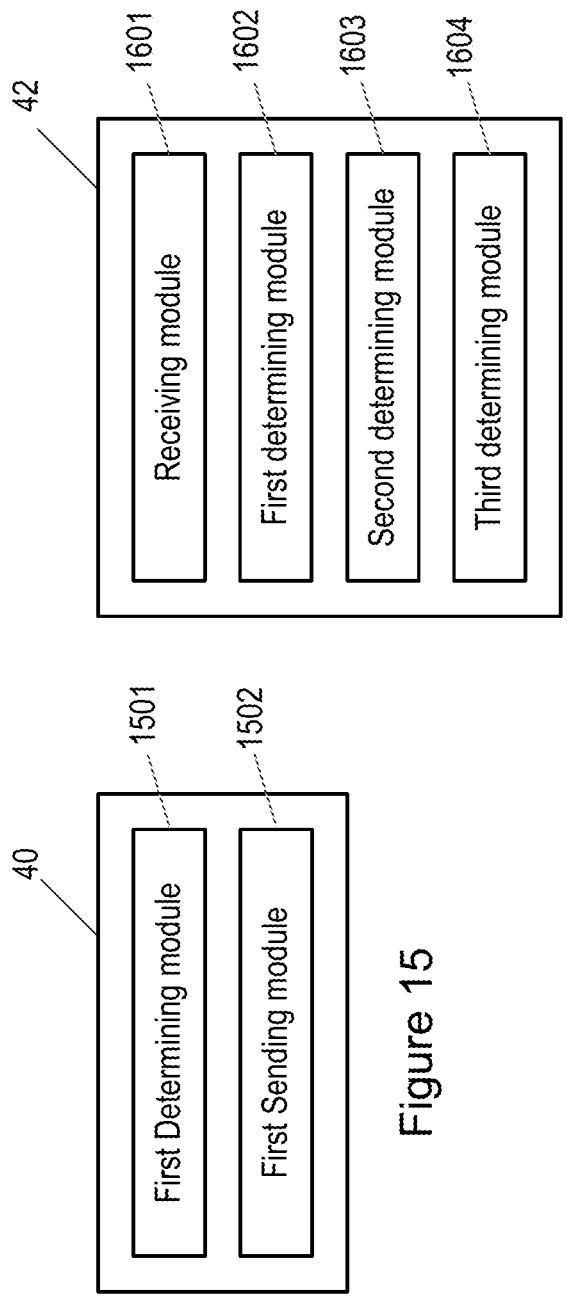
FIG. 15 is a block diagram of a first radio access node according to yet another embodiment.
FIG. 16 is a block diagram of a communication device according to yet another embodiment.

FIG. 15 is a block diagram of a first radio access node 40 according to yet another embodiment. The first radio access node 40 is for use in a communication network 32 and comprises a first determining module 1501 that is configured to determine whether a first base key that is used to determine a first encryption key for encrypting communications between a communication device 42 and the first radio access node 40 can be used by a second radio access node 40 for determining a second encryption key for encrypting communications between the communication device 42 and the second radio access node 40. The first radio access node 40 also comprises a first sending module 1502 that is configured to send the first base key to the second radio access node 40 during handover of the communication device 42 from the first radio access node 40 to the second radio access node 40 if the first base key can be used by the second radio access node 40.

FIG. 16 is a block diagram of a communication device 42 according to yet another embodiment. The communication device 42 comprises a receiving module 1601 that is configured to receive an indication of whether a first base key that was used to determine a first encryption key for encrypting communications between the communication device 42 and a first radio access node 40 in a communication network 32 can be used for determining a second encryption key for encrypting communications between the communication device 42 and a second radio access node 40 in the communication network 32 on handover of the communication device 42 from the first radio access node 40 to the second radio access node 40; a first determining module 1602 configured to determine a second encryption key from the first base key if the received indication indicates that the first base key can be used for determining a second encryption key; a second determining module 1603 configured to determine a second base key from the first base key if the received indication does not indicate that the first base key can be used for determining a second encryption key; and a third determining module 1604 configured to determine a second encryption key for encrypting communications between the communication device 42 and the second radio access node 40 from the second base key.

Figure 17:
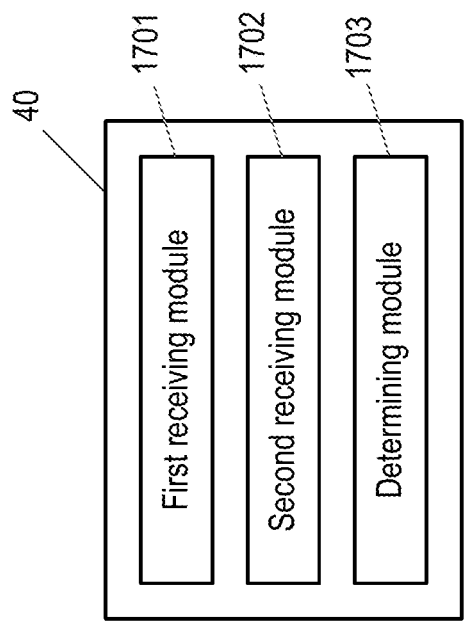
FIG. 17 is a block diagram of a second radio access node according to yet another embodiment.

FIG. 17 is a block diagram of a second radio access node 40 according to yet another embodiment. The second radio access node 40 is for use in a communication network 32 and comprises a first receiving module 1701 configured to receive a first base key from a first radio access node 40 in the communication network 32 during handover of a communication device 42 from the first radio access node 40 to the second radio access node 40; a second receiving module 1702 configured to receive from the first radio access node 40 an indication of an encryption key generation algorithm to use to determine a first encryption key from the first base key; and a determining module 1703 configured to determine the first encryption key for encrypting communications between the communication device 42 and the second radio access node 40 from the first base key using the indicated encryption key generation algorithm.

Figure 18:
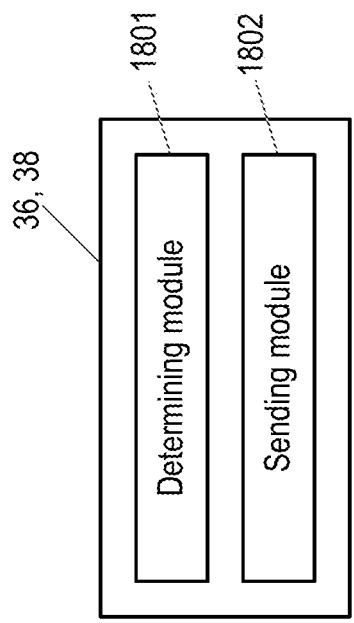
FIG. 18 is a block diagram of a node according to another embodiment.

FIG. 18 is a block diagram of a node 36, 38 according to another embodiment. The node 36, 38 is for use in a communication network 32, and comprises a receiving module 1801 configured to receive a request from a first radio access node 40 in the communication network 32 for information on a second radio access node 40 in the communication network 32, the information relating to whether a first base key that was used to determine a first encryption key for encrypting communications between a communication device 42 and the first radio access node 40 can be used for determining a second encryption key for encrypting communications between the communication device 42 and the second radio access node 40; and a sending module 1802 configured to send information on the second radio access node 40 to the first radio access node 40, the information indicating whether the first base key can be used by the second radio access node 40.

As noted above, the techniques described herein can provide a number of advantages. For example the techniques can: provide for more efficient implementations of handovers for eNBs, provide a faster and smother handover, provide for an operator to configure the network to use the resources more efficiently and not over-do the security, support the virtualisation/cloudification of network functions with lower requirements for buffer memory and decreasing delays at handover, and/or provide the possibility of performing non-interruptive handovers when more than one carrier is being used.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Various embodiments are set out in the following statements:

1. A method of operating a first radio access node in a communication network, the method comprising:
    determining whether a first base key that is used to determine a first encryption key for encrypting communications between a communication device and the first radio access node can used by a second radio access node for determining a second encryption key for encrypting communications between the communication device and the second radio access node; and
    if the first base key can be used by the second radio access node, sending the first base key to the second radio access node during handover of the communication device from the first radio access node to the second radio access node.

2. A method as defined in statement 1, wherein the method further comprises the step of:
    if the first base key can be used by the second radio access node, sending an indication to the communication device that the first base key is to be used for determining a second encryption key for encrypting communications between the communication device and the second radio access node.

3. A method as defined in statement 2, wherein the indication is included in a message relating to the handover of the communication device from the first radio access node to the second radio access node.

4. A method as defined in statement 3, wherein the message is a Radio Resource Control, RRC, Reconfiguration message.

5. A method as defined in any of statements 1-4, wherein if it is determined that the first base key cannot be used by the second radio access node, the method further comprises the steps of:
    determining a second base key from the first base key; and
    sending the second base key to the second radio access node during handover of the communication device from the first radio access node to the second radio access node.

6. A method as defined in any of statements 1-5, wherein if it is determined that the first base key cannot be used by the second radio access node, the method further comprises the step of:
    sending an indication to the communication device to cause the communication device to determine a second base key from the first base key for use with the second radio access node.

7. A method as defined in any of statements 1-6, wherein the step of determining whether the first base key can used by a second radio access node comprises determining that the first base key can be used by the second radio access node if the first radio access node and the second radio access node are part of the same security zone.

8. A method as defined in statement 7, wherein the first radio access node and the second radio access node are part of the same security zone if the first radio access node and the second radio access node are: (a) running as separate virtual machines on the same hardware; (b) two containers within the same virtual machine; (c) implemented on boards in the same physical rack; (d) determined by a security policy as belonging to the same security zone; or (e) physically located in the same site.

9. A method as defined in any of statements 1-6, wherein the step of determining whether the first base key can used by a second radio access node comprises:
    sending a request for information on the second radio access node to another node in the communication network; and
    receiving information on the second radio access node from said another node, the information indicating whether the first base key can be used by the second radio access node.

10. A method as defined in any of statements 1-9, wherein the step of sending the first base key to the second radio access node during handover further comprises sending an indication of an encryption key generation algorithm that was used to determine the first encryption key from the first base key.

11. A method as defined in any of statements 1-10, wherein the first radio access node and the second radio access node share a Packet Data Convergence Protocol, PDCP, function.

12. A first radio access node for use in a communication network, the first radio access node being adapted to:
   determine whether a first base key that is used to determine a first encryption key for encrypting communications between a communication device and the first radio access node can used by a second radio access node for determining a second encryption key for encrypting communications between the communication device and the second radio access node; and
   send the first base key to the second radio access node during handover of the communication device from the first radio access node to the second radio access node if the first base key can be used by the second radio access node.

13. A method of operating a communication device, the method comprising:
   on handover of the communication device from a first radio access node in a communication network to a second radio access node in the communication network, receiving an indication of whether a first base key that was used to determine a first encryption key for encrypting communications between the communication device and the first radio access node can used for determining a second encryption key for encrypting communications between the communication device and the second radio access node;
   if the received indication indicates that the first base key can be used for determining a second encryption key for encrypting communications between the communication device and the second radio access node, determining a second encryption key for encrypting communications between the communication device and the second radio access node from the first base key;
   otherwise, determining a second base key from the first base key; and
   determining a second encryption key for encrypting communications between the communication device and the second radio access node from the second base key.

14. A method as defined in statement 13, wherein the indication is received in a message relating to the handover of the communication device from the first radio access node to the second radio access node.

15. A method as defined in statement 14, wherein the message is a Radio Resource Control, RRC, Reconfiguration message.

16. A method as defined in any of statements 13-15, wherein the indication is received from the first radio access node.

17. A method as defined in any of statements 13-15, wherein the indication is received from the second radio access node.

18. A communication device, the communication device being adapted to:
   receive an indication of whether a first base key that was used to determine a first encryption key for encrypting communications between the communication device and a first radio access node in a communication network can used for determining a second encryption key for encrypting communications between the communication device and a second radio access node in the communication network on handover of the communication device from the first radio access node to the second radio access node;
   determine a second encryption key from the first base key if the received indication indicates that the first base key can be used for determining a second encryption key;
   determine a second base key from the first base key if the received indication does not indicate that the first base key can be used for determining a second encryption key; and
   determine a second encryption key for encrypting communications between the communication device and the second radio access node from the second base key.

19. A method of operating a second radio access node in a communication network, the method comprising:
   receiving a first base key from a first radio access node in the communication network during handover of a communication device from the first radio access node to the second radio access node;
   receiving from the first radio access node an indication of an encryption key generation algorithm to use to determine a first encryption key from the first base key; and
   determining the first encryption key for encrypting communications between the communication device and the second radio access node from the first base key using the indicated encryption key generation algorithm.

20. A second radio access node for use in a communication network, the second radio access node being adapted to:
   receive a first base key from a first radio access node in the communication network during handover of a communication device from the first radio access node to the second radio access node;
   receive from the first radio access node an indication of an encryption key generation algorithm to use to determine a first encryption key from the first base key; and
   determine the first encryption key for encrypting communications between the communication device and the second radio access node from the first base key using the indicated encryption key generation algorithm.

21. A method of operating a node in a communication network, the method comprising:
   receiving a request from a first radio access node in the communication network for information on a second radio access node in the communication network, the information relating to whether a first base key that was used to determine a first encryption key for encrypting communications between a communication device and the first radio access node can used for determining a second encryption key for encrypting communications between the communication device and the second radio access node; and
   sending information on the second radio access node to the first radio access node, the information indicating whether the first base key can be used by the second radio access node.

22. A method as defined in statement 21, wherein the method further comprises the step of:
   determining whether the first base key can used by a second radio access node.

23. A method as defined in statement 22, wherein the step of determining comprises determining that the first base key can be used by the second radio access node if the first radio access node and the second radio access node are part of the same security zone.

24. A method as defined in statement 23, wherein the first radio access node and the second radio access node are part of the same security zone if the first radio access node and the second radio access node are: (a) running as separate virtual machines on the same hardware; (b) two containers within the same virtual machine; (c) implemented on boards in the same physical rack; (d) determined by a security policy as belonging to the same security zone; or (e) physically located in the same site.

25. A node for use in a communication network, the node being adapted to:
   receive a request from a first radio access node in the communication network for information on a second radio access node in the communication network, the information relating to whether a first base key that was used to determine a first encryption key for encrypting communications between a communication device and the first radio access node can used for determining a second encryption key for encrypting communications between the communication device and the second radio access node; and
   send information on the second radio access node to the first radio access node, the information indicating whether the first base key can be used by the second radio access node.

26. A computer program product comprising a computer readable medium having computer readable code embodied therein, the computer readable code being configured such that, on execution by a suitable computer or processor, the computer or processor is caused to perform the method of any of statements 1-11, 13-17, 19 or 21-24.

The invention claimed is:

1. A first radio access node for use in a communication network, wherein the first radio access node comprises a processor and a memory, said memory containing instructions executable by said processor whereby said first radio access node is operative to:
   determine whether a first base key that is used to determine a first encryption key for encrypting communications between a communication device and the first radio access node can be used by a second radio access node for determining a second encryption key for encrypting communications between the communication device and the second radio access node; and
   send the first base key to the second radio access node during handover of the communication device from the first radio access node to the second radio access node if the first base key can be used by the second radio access node; and
   determine a second base key from the first base key if the first base key cannot be used by the second radio access node; and
   wherein if the second key is determined, the first radio access node is further operative to send the second base key to the second radio access node during handover of the communication device from the first radio access node to the second radio access node.

2. The first radio access node as defined in claim 1, wherein the first radio access node is further operative to:
   send an indication to the communication device that the first base key is to be used for determining a second encryption key for encrypting communications between the communication device and the second radio access node if the first base key can be used by the second radio access node.

3. The first radio access node as defined in claim 1, wherein the first radio access node is further operative to:
   send an indication to the communication device to cause the communication device to determine a second base key from the first base key for use with the second radio access node if it is determined that the first base key cannot be used by the second radio access node.

4. The first radio access node as defined in claim 1, wherein the first radio access node is operative to determine whether the first base key can be used by a second radio access node by determining that the first base key can be used by the second radio access node if the first radio access node and the second radio access node are part of the same security zone.

5. The first radio access node as defined in claim 4, wherein the first radio access node and the second radio access node are part of the same security zone if the first radio access node and the second radio access node are: (a) running as separate virtual machines on the same hardware; (b) two containers within the same virtual machine; (c) implemented on boards in the same physical rack; (d) determined by a security policy as belonging to the same security zone; or (e) physically located in the same site.

6. The first radio access node as defined in claim 1, wherein the first radio access node is operative to determine whether the first base key can be used by a second radio access node by:
   sending a request for information on the second radio access node to another node in the communication network; and
   receiving information on the second radio access node from said another node, the information indicating whether the first base key can be used by the second radio access node.

7. The first radio access node as defined in claim 1, wherein the first radio access node is operative to determine whether the first base key can be used by a second radio access node by:
   examining a list or local configuration at the first radio access node.

8. The first radio access node as defined in claim 1, wherein the first radio access node is further operative to send an indication of an encryption key generation algorithm that was used to determine the first encryption key from the first base key.

9. The first radio access node as defined in claim 1, wherein the first radio access node and the second radio access node share a Packet Data Convergence Protocol, PDCP, state.

* * * * *

UNITED STATES PATENT AND TRADEMARK OFFICE
CERTIFICATE OF CORRECTION

PATENT NO. : 11,012,897 B2  
APPLICATION NO. : 15/306806  
DATED : May 18, 2021  
INVENTOR(S) : Axén et al.

Page 1 of 2

It is certified that error appears in the above-identified patent and that said Letters Patent is hereby corrected as shown below:

In the Specification

In Column 6, Line 31, delete "(ASIC)" and insert -- (ASIC(s)) --, therefor.

In Column 9, Line 36, delete "below)." and insert -- below. --, therefor.

In Column 13, Line 13, delete "zone." and insert -- zone). --, therefor.

In Column 14, Line 13, delete "to for" and insert -- for --, therefor.

In Column 14, Line 56, delete "6.3.3." and insert -- 6.3.3). --, therefor.

In Column 15, Line 6, delete "continue" and insert -- continue to --, therefor.

In Column 17, Line 39, delete "smother" and insert -- smoother --, therefor.

In Column 17, Line 64, delete "can" and insert -- can be --, therefor.

In Column 18, Line 41, delete "can" and insert -- can be --, therefor.

In Column 18, Line 56, delete "can" and insert -- can be --, therefor.

In Column 19, Line 13, delete "can" and insert -- can be --, therefor.

In Column 19, Line 30, delete "can" and insert -- can be --, therefor.

In Column 19, Line 66, delete "can" and insert -- can be --, therefor.

In Column 20, Line 51, delete "can" and insert -- can be --, therefor.

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*

In Column 20, Line 61, delete "can" and insert -- can be --, therefor.

In Column 21, Line 18, delete "can" and insert -- can be --, therefor.